United States Patent
Lethellier

(10) Patent No.: US 6,703,812 B1
(45) Date of Patent: Mar. 9, 2004

(54) POWER CONVERTER HAVING IMPROVED STEP DOWN RESPONSE FOR LOW DUTY CYCLE OPERATION

(75) Inventor: Patrice R. Lethellier, Oxnard, CA (US)

(73) Assignee: Semtech Corporation, Camarillo, CA (US)

( * ) Notice: Subject to any disclaimer, the term of this patent is extended or adjusted under 35 U.S.C. 154(b) by 0 days.

(21) Appl. No.: 10/370,412

(22) Filed: Feb. 18, 2003

(51) Int. Cl.[7] .......................... G05F 1/10; G05F 1/652; G05F 1/613
(52) U.S. Cl. ...................................... 323/222; 323/284
(58) Field of Search .................. 323/222, 282, 323/284, 286

(56) References Cited

U.S. PATENT DOCUMENTS 5,861,734 A * 1/1999 Fasullo et al. .............. 323/222
6,272,027 B1 * 8/2001 Fraidlin et al. .............. 363/26
6,348,780 B1 * 2/2002 Grant ......................... 323/222

* cited by examiner

Primary Examiner—Bao Q. Vu
(74) Attorney, Agent, or Firm—O'Melveny & Myers LLP

(57) ABSTRACT

A power converter comprises at least one output inductor having an input and output terminal. At least one first switch circuit is connected to the input terminal of the output inductor to alternately connect the input terminal to at least one voltage source and to ground. A ripple control circuit is coupled to the output terminal and is adapted to clamp output current of the output inductor to an allowable maximum level in response to an output current overshoot condition produced by a step down in load coupled to the output terminal. The ripple control circuit further comprises an inductor conducting the output current to ground upon the output current overshoot condition.

26 Claims, 2 Drawing Sheets

POWER CONVERTER HAVING IMPROVED STEP DOWN RESPONSE FOR LOW DUTY CYCLE OPERATION

BACKGROUND OF THE INVENTION

1. Field of the Invention

The present invention relates to power converter circuits. More particularly, the invention relates to a multi-phase power converter for use in low duty cycle applications having a circuit that clamps output current overshoot in response to a step down in load.

2. Description of Related Art

Switched mode DC-to-DC power converters are commonly used in the electronics industry to convert an available direct current (DC) level voltage to another DC level voltage. A switched mode converter provides a regulated DC output voltage to a load by selectively storing energy in an output inductor coupled to the load by switching the flow of current into the output inductor. A synchronous buck converter is a particular type of switched mode converter that uses two power switches, typically MOSFET transistors, to control the flow of current in the output inductor. A high-side switch selectively couples the inductor to a first power supply voltage while a low-side switch selectively couples the inductor to a second power supply voltage, such as ground. A pulse width modulation (PWM) control circuit is used to control the gating of the high-side and low-side switches in an alternating manner. Synchronous buck converters generally offer high efficiency and high power density, particularly when MOSFET devices are used due to their relatively low on-resistance. Therefore, synchronous buck converters are advantageous for use in providing power to electronic systems, such as microprocessors that require a control voltage ($V_{CC}$) of 1 to 1.5 volts with current ranging from 40 to 60 amps.

For certain applications having especially demanding current load requirements, it is known to combine plural synchronous buck converters together in multi-phase configurations operated in an interleaf mode. The output inductors of each of the multiple channels are connected together to provide a single output voltage. Multi-phase configurations are advantageous in that they provide an increase in the frequency of ripple across the output voltage above the switching frequency of the individual channels, thereby enabling the use of smaller output capacitors to reduce the ripple. Also, by spreading the output current among the multiple channels, the stress on individual components of the power converter is reduced.

While it is desired that the power converter deliver a constant output current and voltage to a load, in practice, the output current and voltage fluctuates in response to changing load conditions. The power converter adapts to these changing load conditions by regulating the output current and voltage in response to feedback signals. When there is a step increase in load, there is a corresponding drop in the output current and/or voltage. The power converter adjusts for this changed load condition by increasing the duty cycle applied to the power switches to thereby increase the power delivered to the load. Conversely, when there is a step decrease in load, there is a corresponding rise in the output current and/or voltage that is accommodated by decreasing the duty cycle applied to the power switches to reduce the power delivered to the load. As a result, the change in the output current and/or voltage remains within an allowable limit, and the output current and/or voltage quickly returns to the desired level.

For certain DC-to-DC conversion applications requiring a relatively large reduction of the input voltage (e.g., from 24 volts to 1 volts), it is known to operate a power converter using a relatively low duty cycle (e.g., less than 10%). Such operation allows good response to a step increase in load. Since the duty cycle is already relatively low, there is ample margin to increase the duty cycle to satisfy the load current demand. But, when there is a step decrease in load, there is little margin to further decrease the already low duty cycle in order to reduce the current delivered to the output inductor. Furthermore, since the voltage across the output inductors is so low (e.g., 1 volt), the rate of change of current through the inductor is also very low. The output inductors are therefore not able to quickly respond to the changing load condition and the excess current flows into the load. If the output current rises above the desired level (referred to as current overshoot), there can be significant damage to the load.

Accordingly, it would be desirable to provide an improved way to control the output current of a low duty cycle power converter to avoid current overshoot caused by a step down in load. More particularly, it would be desirable to provide an improved way to control the output current of a multiple-phase, low duty cycle power converter to avoid current overshoot caused by a step down in load.

SUMMARY OF THE INVENTION

The present invention overcomes these drawbacks of the prior art by providing a way to control the output current of a low duty cycle power converter to avoid current overshoot caused by a step down in load.

In an embodiment of the invention, a power converter comprises at least one output inductor having an input terminal and an output terminal. The output terminal provides an output voltage therefrom. At least one switch circuit is connected to the input terminal to alternately connect the input terminal to a voltage source and to ground. A ripple control circuit is coupled to the output terminal and is adapted to clamp output current of the output inductor to an allowable maximum level in response to an output current overshoot condition produced by a step down in load coupled to the output terminals. The ripple control circuit further comprises an inductor conducting the output current to ground upon the output current overshoot condition.

More particularly, the ripple control circuit further comprises a capacitor connected in series with the inductor. A high-side switch is coupled to the at least one voltage source and a low-side switch is coupled to ground. The inductor and the capacitor are coupled to a node defined between the high-side switch and the low-side switch. The capacitor is charged by activation of the high-side switch. The capacitor is charged to a voltage substantially higher than the output voltage. The low-side switch is activated upon the output current overshoot condition. The inductor has an inductance substantially lower than the output inductor.

In another embodiment of the invention, the ripple control circuit further comprises a current sensor coupled in parallel with the inductor. The current sensor further comprises a capacitor and resistor coupled in series, and a differential amplifier adapted to measure a voltage across the capacitor. The measured voltage corresponds to the current through the inductor. By arranging the series coupled inductor and capacitor, the measured voltage can be referenced to the output voltage.

A more complete understanding of the method and apparatus for controlling the output current of a low duty cycle power converter to avoid current overshoot caused by a step down in load will be afforded to those skilled in the art, as well as a realization of additional advantages and objects thereof, by a consideration of the following detailed description of the preferred embodiment. Reference will be made to the appended sheets of drawings that will first be described briefly.

DETAILED DESCRIPTION OF THE PREFERRED EMBODIMENT

The present invention satisfies the need for an improved way to control the output current of a low duty cycle power converter to avoid current overshoot caused by a step down in load. In the detailed description that follows, like element numerals are used to describe like elements illustrated in one or more of the figures.

Figure 1:
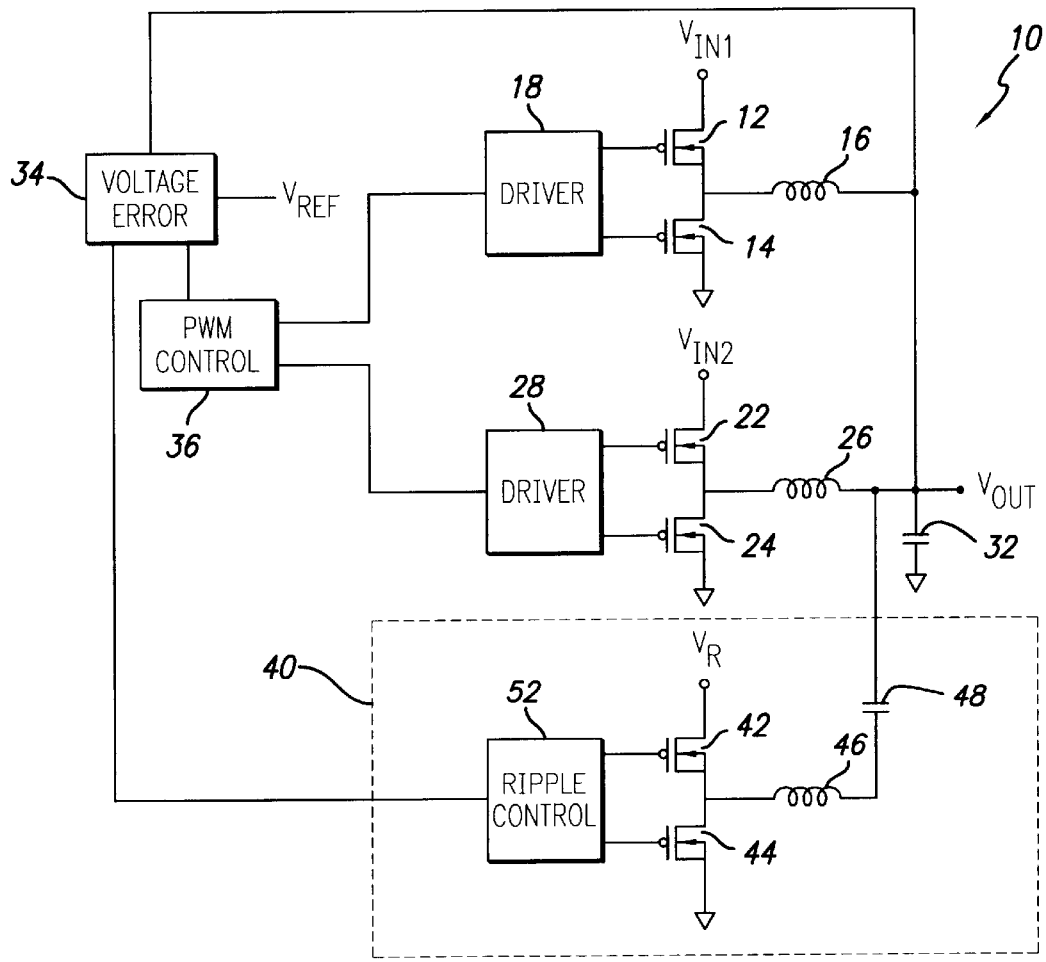
FIG. 1 is a schematic diagram of a DC-to-DC power converter in accordance with an embodiment of the invention.

Referring first to FIG. 1, a multi-phase DC-to-DC power converter 10 is illustrated in accordance with an embodiment of the invention. The DC-to-DC power converter 10 provides an output voltage ($V_{OUT}$) to a load (not shown). A capacitor 32 is electrically connected in parallel with the load to provide smoothing of the output voltage $V_{OUT}$. As will be further described below, the exemplary multi-phase DC-to-DC power converter includes two channels, but it should be appreciated any number of channels could be advantageously utilized in accordance with the invention.

The first channel of the multi-phase power converter 10 includes a high-side power switch 12 and a low-side power switch 14 connected to a first input voltage source ($V_{IN1}$). The high-side power switch 12 and the low-side power switch 14 are generally provided by MOSFET devices, with the drain of the high-side power switch 12 electrically connected to the first input voltage source $V_{IN1}$, the source of the high-side power switch 12 electrically connected to the drain of the low-side power switch 14, and the source of the low-side power switch 14 electrically connected to ground. A power phase node is defined between the source of the high-side power switch 12 and the drain of the low-side power switch 14. An output inductor 16 is connected in series between the power phase node and the load. A channel one driver 18 provides a series of pulse width modulated control pulses to the power switches 12, 14 to turn the power switches on and off in an alternating manner.

The second channel of the power converter has a similar construction as the first channel, and includes a high-side power switch 22 and a low-side power switch 24 generally provided by MOSFET devices and connected to a second input voltage source ($V_{IN2}$). A power phase node is defined between the source of the high-side power switch 22 and the drain of the low-side power switch 24. An output inductor 26 is connected in series between the power phase node and the load. The output inductors 16, 26 are connected together to provide a single output voltage ($V_{OUT}$). The first input voltage source ($V_{IN1}$) may be the same as the second input voltage source ($V_{IN2}$), or they may each be distinct voltage sources having different voltage levels. A channel two driver 28 provides a series of pulse width modulated control pulses to the power switches 22, 24 to turn them on and off in an alternating manner.

A pulse width modulation (PWM) control circuit 36 is connected to the channel one driver 18 and the channel two driver 28. The PWM control circuit 36 provides control signals to the channel one and two drivers 18, 28, which in turn regulate the output voltage and/or current delivered to the load by controlling the timing and duration of conduction of the power switches of the first and second channels. The PWM control circuit 36 receives a voltage error signal via a feedback loop. The PWM control circuit 36 uses the voltage error signal to maintain the output voltage ($V_{OUT}$) at a desired voltage level. A voltage error circuit 34 compares the output voltage ($V_{OUT}$) (or a divided down representative voltage) to a reference voltage ($V_{REF}$), and provides the voltage error signal. The PWM control circuit 36 thereby regulates the two channels in a manner that minimizes the voltage error signal. The PWM control circuit 36 may also receive a current share signal (not shown) that reflects whether the two channels are carrying a desired proportion of the output current. The PWM control circuit 36 can thereby ensure current sharing by regulating the two channels in a manner that minimizes the current share signal.

As discussed above, it is anticipated that the power converter 10 operate using a relatively low duty cycle (e.g., less than 10%). Such operation allows good response to a step increase in load, but, when there is a step decrease in load, there is little margin to further decrease the already low duty cycle in order to reduce the current delivered to the output inductor. This is graphically illustrated in FIG. 3, which shows the output current ($I_{OUT}$) varying with time (t) in response to changing load conditions relative to a desired target current level (shown in phantom). A step up in load is reflected at the latter part of the illustrated output current graph, in which the current dips slightly in response to the load increase and then quickly recovers to the target current level. In contrast, a step down in load is reflected at the earlier part of the output current graph, in which the current rises sharply (i.e., overshoots) in response to the load decrease before recovering to the target current level.

The voltage across an inductor corresponds to the rate of change of the current. When the low-side power switches 14, 24 are conducting, the voltage across the output inductors 16, 26 is approximately equal to the output voltage $V_{OUT}$, which is relatively low (e.g., 1 volt). Thus, the rate of change of the current in the output inductors 16, 26 is also relatively low. It is therefore difficult to quickly reduce the current in the output inductors 16, 26 in response to the step down in load. In the prior art, the current overshoot reflected at the earlier part of the output current graph would have nowhere to go but into the load. As will be further described below, the present invention solves this problem by channeling the excess current to ground using a ripple control circuit 40.

Returning to FIG. 1, the ripple control circuit 40 circuit includes a high-side switch 42 and a low-side switch 44 connected to a voltage source ($V_R$). The high-side switch 42 and the low-side switch 44 are generally provided by MOSFET devices, with the drain of the high-side switch 42 electrically connected to the voltage source $V_R$, the source of the high-side switch 42 electrically connected to the drain of the low-side switch 44, and the source of the low-side switch 44 electrically connected to ground. The voltage source ($V_R$) may be the same as the first and/or second input voltage sources ($V_{IN1}$, $V_{IN2}$), or they may each be distinct voltage sources having different voltage levels. An inductor 46 is connected to the junction between the source of the high-side switch 42 and the drain of the low-side switch 44. The inductor 46 is connected in series with a capacitor 48 that is in turn connected to the output terminal coupled to the load. A ripple control driver 52 provides signals to the switches 42, 44 to control their activation timing (as will be further discussed below). The inductor 46 is selected to have an inductance that is much smaller than the inductors 16, 26.

As an initial condition, the capacitor 48 is charged to a voltage substantially higher than the output voltage ($V_{OUT}$), e.g., 7 volts. This is accomplished by the ripple control driver 52 providing an activation pulse to turn on the high-side switch 42 for a period of time to allow current to pass through inductor 46 to charge the capacitor 48. The voltage error circuit 34 provides the voltage error signal to the ripple control driver 52. The ripple control driver 52 interprets a sharply increasing voltage error signal as a step down in load. When a step down in load is detected, the ripple control driver 52 provides an activation pulse to turn on the low-side switch 44 that connects the inductor 46 to ground so the voltage across the inductor 46 is approximately equal to the charge on the capacitor 48. In view of the relatively higher voltage and the relatively lower inductance of inductor 46, the rate of change of the current through the inductor 46 is relatively high (in comparison to the rate of change of the current through output inductors 16, 26). The inductor 46 thereby quickly sinks current from the output inductors 16, 26 to ground to clamp the output current and prevent the current overshoot condition. When the voltage error signal decreases, reflecting that the current overshoot has resolved, the ripple control driver 52 turns off the low-side switch 44 and turns on the high-side switch 42 to allow the capacitor 48 to recharge.

Figure 3:
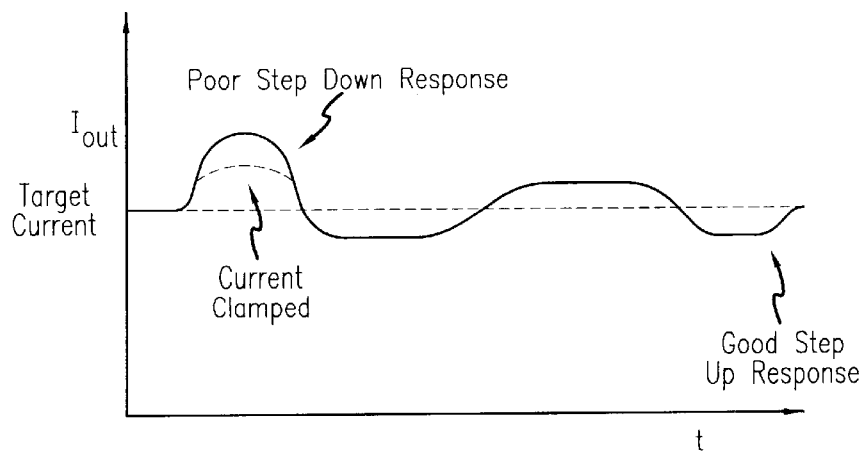
FIG. 3 is a graph illustrating the output current of the DC-to-DC power converter with respect to various load conditions.

This is shown graphically in FIG. 3. As described above, FIG. 3 illustrates the current overshoot resulting from a step down in load. FIG. 3 also shows the clamped current level (in phantom) by operation of the ripple control circuit. The recharge cycle of the capacitor 48 occurs in the period following the current overshoot.

It should be appreciated that the ripple control circuit 40 could be adapted to detect the step down in load using other known types of circuitry without reliance upon the voltage error signal. For example, a threshold detector coupled to the output inductors 16, 26 could be adapted to detect increases in the output voltage $V_{OUT}$ that reflect a step down condition. This way, the ripple control circuit 40 could be arranged as a stand-alone circuit, and would not be limited to applications that include the voltage error circuit 34.

Figure 2:
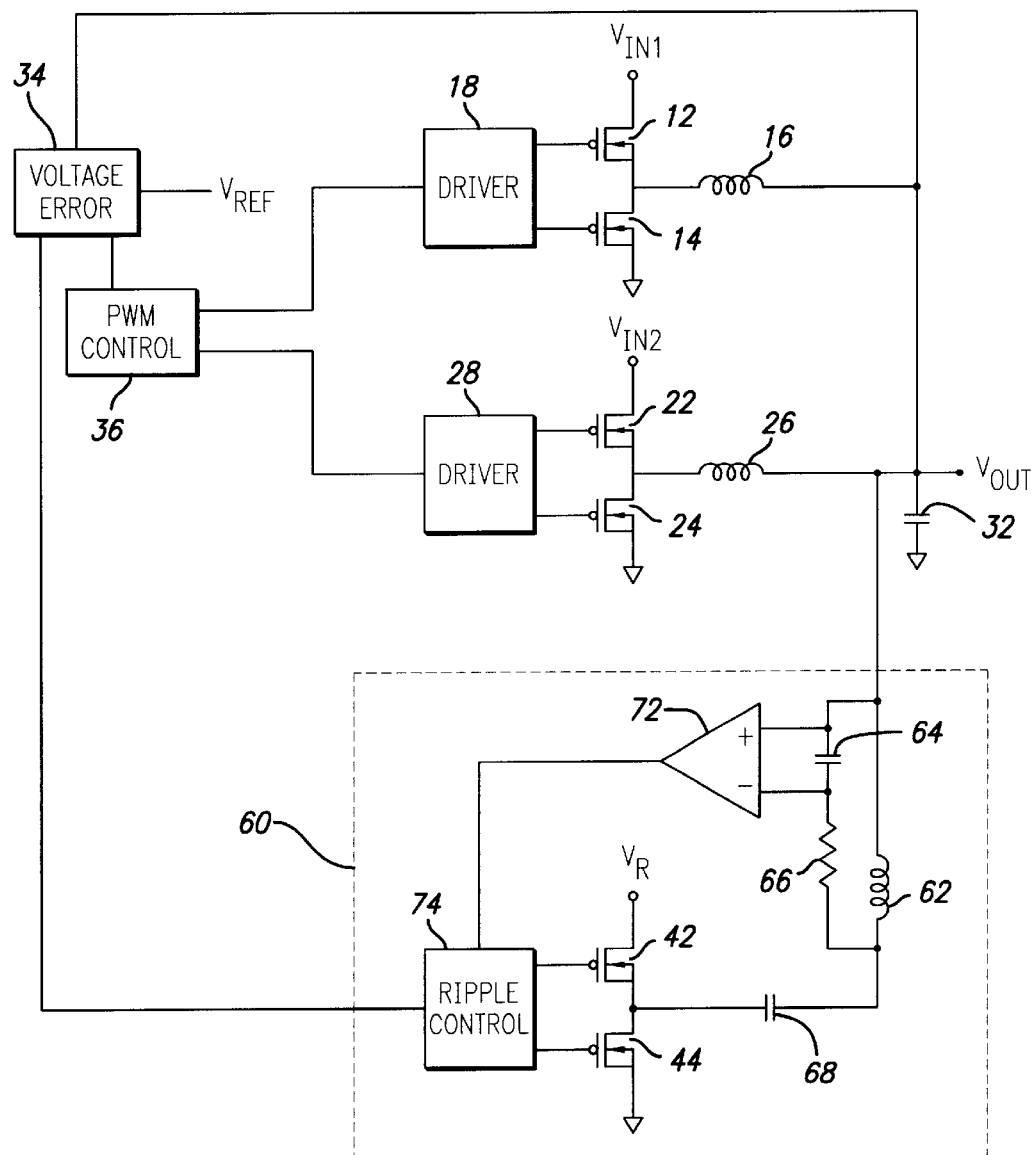
FIG. 2 is a schematic diagram of a DC-to-DC power converter in accordance with an alternative embodiment of the invention.

Referring now to FIG. 2, a multi-phase DC-to-DC power converter is illustrated in accordance with another embodiment of the invention. This embodiment includes an alternative ripple control circuit 60. The ripple control circuit 60 includes high-side and low-side switches 42, 44 substantially as described above. The order of the inductor and capacitor in the ripple control circuit 60 is reversed from the previous embodiment. Instead, a capacitor 68 is connected to the junction between the source of the high-side switch 42 and the drain of the low-side switch 44. The capacitor 68 is connected in series with an inductor 62 that is in turn connected to the output terminal coupled to the load. The ripple control circuit 60 otherwise operates substantially as described above with respect to FIG. 1.

In this embodiment, the ripple control circuit 60 further includes a current sensor in parallel with the inductor 62 for the purpose of detecting the amount of current being sinked from the output inductors 16, 26. The current sensor includes resistor 66 and capacitor 64 connected together in series. The signal passing through the inductor 62 includes a DC component and an AC component. The inductor 62 is comprised of a wire material, such as copper, that has an inherent resistance per unit length that results in a DC resistance value. The AC component of the signal depends on the inductance and internal resistance values of the inductor 62, as well as the resistance and capacitance of the current sensor. By selecting the values of the resistor and capacitor to define a time constant having a known relationship with the corresponding time constant of the inductor 62, the instantaneous voltage across the capacitor 64 can be made equal to the voltage across the DC resistance of the inductor and thereby proportional to the instantaneous current through the output inductor. Thus, the sink current through inductor 62 can be accurately sensed using differential amplifier 72 adapted to measure the voltage across capacitor 64. Since the capacitor 64 is coupled to the output terminal of the power converter, the voltage across the capacitor 64 is referenced to the output voltage $V_{OUT}$. The differential amplifier 72 provides an output signal to the ripple control driver 74, which in turn uses the measurement of the sink current to determine the timing of turning off the low-side switch 44.

While the foregoing embodiments of the invention have been described in conjunction with multiple-phase power converters, it should be appreciated that the improved step down response provided by the invention would be applicable to single phase power converters as well.

Having thus described a preferred embodiment of a multi-phase power converter having improved step down response for low duty cycle operation, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A power converter, comprising:
   at least one output inductor having an input terminal and an output terminal, said output terminal providing an output voltage therefrom;
   at least one switch circuit connected to said input terminal, said at least one switch circuit alternately connecting said input terminal to a voltage source and to ground; and
   a ripple control circuit coupled to said output terminal and being adapted to clamp output current of said at least one output inductor to an allowable maximum level in response to an output current overshoot condition produced by a step down in load coupled to said output terminal, said ripple control circuit further comprising an inductor conducting said output current to ground upon said output current overshoot condition.

2. The power converter of claim 1, further comprising an error amplifier providing a voltage error signal corresponding to a difference between an output voltage at said output terminal and a reference voltage, said ripple control circuit detecting said output current overshoot condition from said voltage error signal.

3. The power converter of claim 1, wherein said ripple control circuit further comprises a capacitor connected in series with said inductor.

4. The power converter of claim 3, wherein said ripple control circuit further comprises a high-side switch coupled to said voltage source and a low-side switch coupled to ground, said inductor and said capacitor being coupled to a node defined between said high-side switch and said low-side switch.

5. The power converter of claim 4, wherein said capacitor is charged by activation of said high-side switch, said capacitor being charged to a voltage substantially higher than said output voltage.

6. The power converter of claim 4, wherein said low-side switch is activated upon said output current overshoot condition.

7. The power converter of claim 1, wherein said inductor has an inductance substantially lower than said at least one output inductor.

8. The power converter of claim 1, wherein said ripple control circuit further comprises a current sensor coupled in parallel with said inductor.

9. The power converter of claim 8, wherein said current sensor further comprises a capacitor and resistor coupled in series, and a differential amplifier adapted to measure a voltage across said capacitor, said measured voltage corresponding to current through said inductor.

10. The power converter of claim 9, wherein said measured voltage is referenced to said output voltage.

11. The power converter of claim 1, further comprising a multiple-phase power converter.

12. A power converter, comprising:
    at least one output inductor having an input terminal and an output terminal, said output terminal providing an output voltage therefrom;
    at least one switch circuit connected to said input terminal, said at least one switch circuit alternately connecting said input terminal to a voltage source and to ground; and
    means for clamping output current of said at least one output inductor to an allowable maximum level in response to an output current overshoot condition produced by a step down in load coupled to said output terminal.

13. The power converter of claim 12, wherein said clamping means further comprises an inductor conducting said output current to ground upon said output current overshoot condition.

14. The power converter of claim 12, further comprising an error amplifier providing a voltage error signal corresponding to a difference between said output voltage and a reference voltage, said clamping means detecting said output current overshoot condition from said voltage error signal.

15. The power converter of claim 13, wherein said clamping means further comprises a capacitor connected in series with said inductor.

16. The power converter of claim 15, wherein said clamping means further comprises a high-side switch coupled to said at least one voltage source and a low-side switch coupled to ground, said inductor and said capacitor being coupled to a node defined between said high-side switch and said low-side switch.

17. The power converter of claim 16, wherein said capacitor is charged by activation of said high-side switch, said capacitor being charged to a voltage substantially higher than said output voltage.

18. The power converter of claim 17, wherein said low-side switch is activated upon said output current overshoot condition.

19. The power converter of claim 13, wherein said inductor has an inductance substantially lower than either of said first and second output inductors.

20. The power converter of claim 13, wherein said clamping means further comprises a current sensor coupled in parallel with said inductor.

21. The power converter of claim 20, wherein said current sensor further comprises a capacitor and resistor coupled in series, and a differential amplifier adapted to measure a voltage across said capacitor, said measured voltage corresponding to current through said inductor.

22. The power converter of claim 21, wherein said measured voltage is referenced to said output voltage.

23. The power converter of claim 12, further comprising a multiple-phase power converter.

24. In a power converter comprising at least one output inductor having an input terminal and an output terminal, said output terminal providing an output voltage therefrom, at least one switch circuit connected to said input terminal to alternately connect said input terminal to a voltage source and to ground, a method for clamping output current comprises the steps of:
    coupling an inductor to said output terminal;
    providing a voltage across said inductor that is substantially higher than said output voltage;
    monitoring said output voltage to detect a current overshoot condition caused by a step down in load; and
    upon detection of said current overshoot condition, conducting output current to ground through said inductor.

25. The method of claim 24, further comprising sensing current conducted through said inductor.

26. The method of claim 24, wherein said voltage providing step further comprises charging a capacitor coupled in series with said inductor and said output terminals.

* * * * *